(12) United States Patent
Hirano et al.

(10) Patent No.: US 9,340,444 B2
(45) Date of Patent: May 17, 2016

(54) OPTICAL FIBER PREFORM MANUFACTURING METHOD, OPTICAL FIBER PREFORM, AND OPTICAL FIBER

(71) Applicant: SUMITOMO ELECTRIC INDUSTRIES, LTD., Osaka-shi, Osaka (JP)

(72) Inventors: Masaaki Hirano, Yokohama (JP); Tetsuya Haruna, Yokohama (JP); Yoshiaki Tamura, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 14/376,929

(22) PCT Filed: Dec. 13, 2012

(86) PCT No.: PCT/JP2012/082369
§ 371 (c)(1),
(2) Date: Aug. 6, 2014

(87) PCT Pub. No.: WO2013/118389
PCT Pub. Date: Aug. 15, 2013

(65) Prior Publication Data
US 2015/0299022 A1  Oct. 22, 2015

(30) Foreign Application Priority Data
Feb. 9, 2012  (JP) ................................ 2012-026296

(51) Int. Cl.
*G02B 6/00* (2006.01)
*C03B 37/018* (2006.01)
*G02B 6/02* (2006.01)

(52) U.S. Cl.
CPC ..... *C03B 37/01815* (2013.01); *C03B 37/01807* (2013.01); *G02B 6/02* (2013.01);
(Continued)

(58) Field of Classification Search
CPC .............. G02B 6/02; C03B 37/01815; C03B 37/01807; C03B 2201/075; C03B 2201/08; C03B 2201/12; C03B 2201/20; C03B 2201/50; C03B 2207/90
USPC .................................................. 385/141–143
See application file for complete search history.

(56) References Cited

U.S. PATENT DOCUMENTS 4,336,049 A * 6/1982 Takahashi ......... C03B 37/01413
65/390
4,388,098 A * 6/1983 Takahashi ......... C03B 37/01413
422/129

(Continued)

FOREIGN PATENT DOCUMENTS

CN  1842499 A  10/2006
JP  H01-286932 A  11/1989

(Continued)

OTHER PUBLICATIONS

Office Action issued Oct. 27, 2015 in Chinese Patent Application No. 201280069472.1 (9 pages) with an English Translation (14 pages).
(Continued)

*Primary Examiner* — Ryan Lepisto
*Assistant Examiner* — Guy Anderson
(74) *Attorney, Agent, or Firm* — Drinker Biddle & Reath LLP

(57) ABSTRACT

A method includes (1) a thermal diffusion process for using an alkali metal salt raw material having an average particle size of 1 mm or less in diameter, supplying a vapor of the alkali metal salt produced by heating the alkali metal salt raw material together with a carrier gas to the inside of a silica-based glass pipe from one end side of the glass pipe, and heating the glass pipe using a heat source which relatively moves in a longitudinal direction of the glass pipe to cause an oxidation reaction of an alkali metal and thermally diffuse the alkali metal into an inner side of the glass pipe, (2) a collapsing process for collapsing the glass pipe after the thermal diffusion process to prepare a core rod; and (3) a cladding portion addition process for adding a cladding portion around the core rod prepared in the collapsing process.

8 Claims, 5 Drawing Sheets

(52) U.S. Cl.
CPC ....... *C03B2201/075* (2013.01); *C03B 2201/08* (2013.01); *C03B 2201/12* (2013.01); *C03B 2201/20* (2013.01); *C03B 2201/50* (2013.01); *C03B 2207/90* (2013.01)

(56) References Cited

U.S. PATENT DOCUMENTS

| | | | |
|---|---|---|---|
| 5,146,534 | A | 9/1992 | Lines |
| 8,844,323 | B2 * | 9/2014 | Kitamura .......... C03B 37/01807 65/399 |
| 2003/0045421 | A1 * | 3/2003 | Burger .................... C03C 3/122 501/41 |
| 2004/0057692 | A1 | 3/2004 | Ball et al. |
| 2005/0063663 | A1 | 3/2005 | Anderson et al. |
| 2006/0130530 | A1 | 6/2006 | Anderson et al. |
| 2008/0050086 | A1 | 2/2008 | Bickham et al. |
| 2008/0279515 | A1 | 11/2008 | Bickham et al. |
| 2011/0314874 | A1 | 12/2011 | Kitamura |
| 2012/0060561 | A1 | 3/2012 | Kitamura |

FOREIGN PATENT DOCUMENTS

| | | |
|---|---|---|
| JP | 2005-537210 A | 12/2005 |
| JP | 2007-504080 A | 3/2007 |
| JP | 2008-536190 A | 9/2008 |
| JP | 2009-541796 A | 11/2009 |
| JP | 2010-501894 A | 1/2010 |
| JP | 2010-526749 A | 8/2010 |
| JP | 2012-006779 A | 1/2012 |
| WO | WO-98/02389 A1 | 1/1998 |

OTHER PUBLICATIONS

English-language translation of International Preliminary Report on Patentability (IPRP) dated Aug. 21, 2014 that issued in WO Patent Application No. PCT/JP2012/082369.

* cited by examiner

US 9,340,444 B2

OPTICAL FIBER PREFORM MANUFACTURING METHOD, OPTICAL FIBER PREFORM, AND OPTICAL FIBER

TECHNICAL FIELD

The present invention relates to a method of manufacturing an optical fiber preform, an optical fiber preform, and an optical fiber.

BACKGROUND ART

An optical fiber including silica based glass containing an alkali metal element doped in a core area is known (see Patent Literatures 1 to 9). When the alkali metal element is doped in a core portion of an optical fiber preform, viscosity of the core portion can be reduced when the optical fiber preform is drawn into an optical fiber, and relaxation of a network structure of the silica glass progresses. Thus, transmission loss of the optical fiber may be reduced.

A diffusion method is known as a method of doping the alkali metal element into a silica glass (e.g., see Patent Literatures 1 and 2). In the diffusion method, the alkali metal element is diffusively doped to an inner surface of a glass pipe by heating the glass pipe using an external heat source or producing plasma inside the glass pipe while introducing a raw material vapor such as the alkali metal element or an alkali metal salt, which is a raw material, into the glass pipe.

After the alkali metal element is doped to the vicinity of the inner surface of the glass pipe in this way, this glass pipe is heated so that its diameter is reduced. After the reduction of the diameter, a certain thickness of the inner surface of the glass pipe is etched for the purpose of removing a transition metal element or the like (e.g., Ni or Fe) contaminated at the same time as the doping of the alkali metal element. After etching, a core rod containing an alkali metal element is manufactured by heating and collapsing the glass pipe. A cladding portion is synthesized onto an outer side of the core rod containing the alkali metal element to manufacture an optical fiber preform. Also, an optical fiber can be manufactured by drawing this optical fiber preform.

CITATION LIST

Patent Literature

[Patent Literature 1] Japanese Unexamined Patent Application Publication (Translation of PCT Application) No. 2005-537210
[Patent Literature 2] US Patent Application Publication No. 2006/0130530
[Patent Literature 3] Japanese Unexamined Patent Application Publication (Translation of PCT Application) No. 2007-504080
[Patent Literature 4] Japanese Unexamined Patent Application Publication (Translation of PCT Application) No. 2008-536190
[Patent Literature 5] Japanese Unexamined Patent Application Publication (Translation of PCT Application) No. 2010-501894
[Patent Literature 6] Japanese Unexamined Patent Application Publication (Translation of PCT Application) No. 2009-541796
[Patent Literature 7] Japanese Unexamined Patent Application Publication (Translation of PCT Application) No. 2010-526749
[Patent Literature 8] International Publication No. 98/002389
[Patent Literature 9] U.S. Pat. No. 5,146,534

SUMMARY OF INVENTION

Technical Problem

A diffusion coefficient of an alkali metal element in a silica-based glass is greater by one digit or more than a diffusion coefficient of a transition metal element such as Ni or Fe. In other words, an alkali metal element diffuses faster than a transition metal element. Therefore, regardless of etching a glass surface to a thickness to remove the transition metal element in the above etching process, the alkali metal element doped in the silica glass can remain. However, since the diffusion coefficient of the alkali metal element and the diffusion coefficient of an OH group in the silica-based glass are at the same level, it is difficult to completely remove the OH group while leaving the alkali metal element when the OH group is added at the same time in a process of diffusing the alkali metal element.

Further, the alkali metal salt raw material is highly hygroscopic and often contains much adsorbed water or may contain hydration water. In Patent Literature 1, KBr as the alkali metal salt raw material is heated at a temperature of 1000° C., melted, and dewatered. However, there is a problem in that a large amount of the raw material is consumed in concurrence with dewatering since a vapor pressure of KBr at a temperature of 1000° C. is as high as 3 kPa. In addition, there is a possibility of the alkali metal element and water reacting to form an alkali hydroxide when the alkali metal salt raw material is melted. Further, there is a possibility of the silica glass and the water reacting to form a Si—OH group when the temperature is 550° C. or more.

There is a problem in that the optical fiber having the alkali metal element doped in the core in this way may contain relatively many OH groups, and that a transmission loss in a wavelength range of 1.38 μm may increase.

The present invention has been made to solve the aforementioned problems and an object of the present invention is to provide a method capable of manufacturing an optical fiber preform suitable for drawing an optical fiber containing an alkali metal element and having low transmission loss in a wavelength range of 1.38 μm.

Solution to Problem

A method of manufacturing an optical fiber preform according to one aspect of the present invention includes: (1) a thermal diffusion process including supplying a vapor of the alkali metal salt produced by heating the alkali metal salt raw material having an average particle size of 1 mm or less in diameter together with a carrier gas to the inside of a silica-based glass pipe from one end side of the glass pipe, and heating the glass pipe using a heat source which relatively moves in a longitudinal direction of the glass pipe to cause an oxidation reaction of an alkali metal and thermally diffuse the alkali metal into an inner side of the glass pipe; (2) a collapsing process for collapsing the glass pipe after the thermal diffusion process to prepare a core rod; and (3) a cladding portion addition process for adding a cladding portion around the core rod prepared in the collapsing process.

The method of manufacturing an optical fiber preform according to the aspect of the present invention may include a drying process for heating the alkali metal salt raw material at a temperature of 270° C. or more to dry the alkali metal salt raw material before the thermal diffusion process. In the drying process, the alkali metal salt raw material may be heated at a temperature less than a melting point of the alkali metal salt raw material to dry the alkali metal salt raw material. The drying process may include a first drying process for heating the alkali metal salt raw material at a temperature less than a melting point of the alkali metal salt raw material to dry the alkali metal salt raw material; and a second drying process for heating the alkali metal salt raw material at a temperature equal to or more than the melting point of the alkali metal salt raw material to dry the alkali metal salt raw material after the first drying process. The glass pipe may contain chlorine and fluorine as additives, an average concentration of each of the chlorine and the fluorine may be 10 atomic ppm or more, and a concentration of other additives may be 10 atomic ppm or less. In the thermal diffusion process, the alkali metal may be thermally diffused into an inner side of the glass pipe so that the concentration of the alkali metal has a maximum value of 500 atomic ppm or more.

An optical fiber preform according to another aspect of the present invention is made by the method of manufacturing an optical fiber preform according to the previous aspect of the present invention described above, and an average concentration of an OH group in a core portion is 0.002 mol·ppm or less. An optical fiber according to yet another aspect of the present invention is made by drawing the optical fiber preform according to the previous aspect of the present invention described above, and a transmission loss increase due to OH group absorption in a wavelength range of 1.38 μm is 0.1 dB/km or less.

Advantageous Effects of Invention

According to the present invention, it is possible to manufacture an optical fiber preform suitable for drawing an optical fiber containing an alkali metal element and having low transmission loss in a wavelength range of 1.38 μm.

DESCRIPTION OF EMBODIMENTS

Hereinafter, embodiments of the present invention will be described in detail with reference to the accompanying drawings. Further, the same elements are denoted with the same reference signs in the description of the drawings, and repeated description is omitted.

A method of manufacturing an optical fiber preform according to the present embodiment includes a drying process, a thermal diffusion process, a collapsing process, and a cladding portion addition process. In the drying process, an alkali metal salt raw material having an average particle size of 1 mm or less and preferably 0.5 mm or less in diameter is heated and dried at a temperature equal to or more than 270° C. and less than a melting point. In the thermal diffusion process, a vapor of the alkali metal salt produced by heating this alkali metal salt raw material is supplied together with a carrier gas to the inside of a silica-based glass pipe from one end side of the glass pipe, and the glass pipe is heated using a heat source which relatively moves in a longitudinal direction of the glass pipe to cause an oxidation reaction of an alkali metal element and thermally diffuse the alkali metal into an inner side of the glass pipe. In the collapsing process, the glass pipe after the thermal diffusion process is collapsed to prepare a core rod. Also, in the cladding portion addition process, a cladding portion is added around the core rod prepared in the collapsing process, thus manufacturing an optical fiber preform.

Further, the average particle size of the alkali metal salt raw material in the present embodiment was measured by acquiring an image of the alkali metal salt raw material using an optical microscope and obtaining a size of the particle of the alkali metal salt raw material from the image through conversion. Here, the number of particles of the measured alkali metal salt raw material was several thousands, and a let an average particle size be median (median value) of a diameter distribution of the particle.

Figure 1:
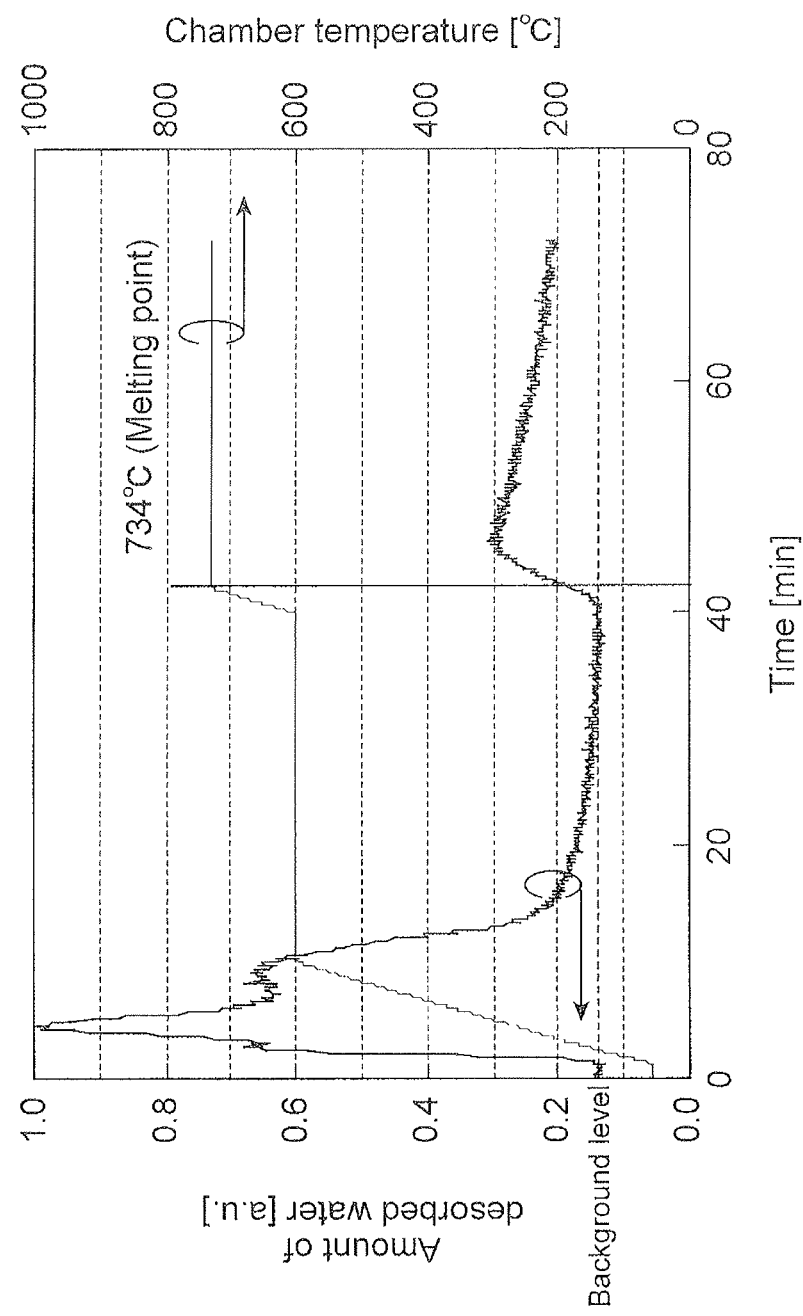
FIG. 1 is a graph illustrating a result of performing thermal desorption spectroscopy (TICS) under a nitrogen atmosphere for potassium bromide (KBr) as an alkali metal salt raw material.

FIG. 1 is a graph showing a result of performing thermal desorption spectroscopy (TDS) for potassium bromide (KBr) as an alkali metal salt raw material under a nitrogen atmosphere. KBr used in this case was crystalline, and a particle size thereof was about 3 mm. There is a peak at which desorption of water is suddenly rapid around a temperature of 270° C., as illustrated in FIG. 1. When the alkali metal raw material is heated from 270° C. to 600° C. for 10 minutes and then maintained at 600° C., the desorption of the water is reduced to substantially a background level after heating for about 20 minutes. This shows that an amount of absorbed water near a surface of a KBr solid can be removed by starting rapid desorption at about 270° C. and performing heating at 270° C. or more for 30 minutes.

Figure 2:
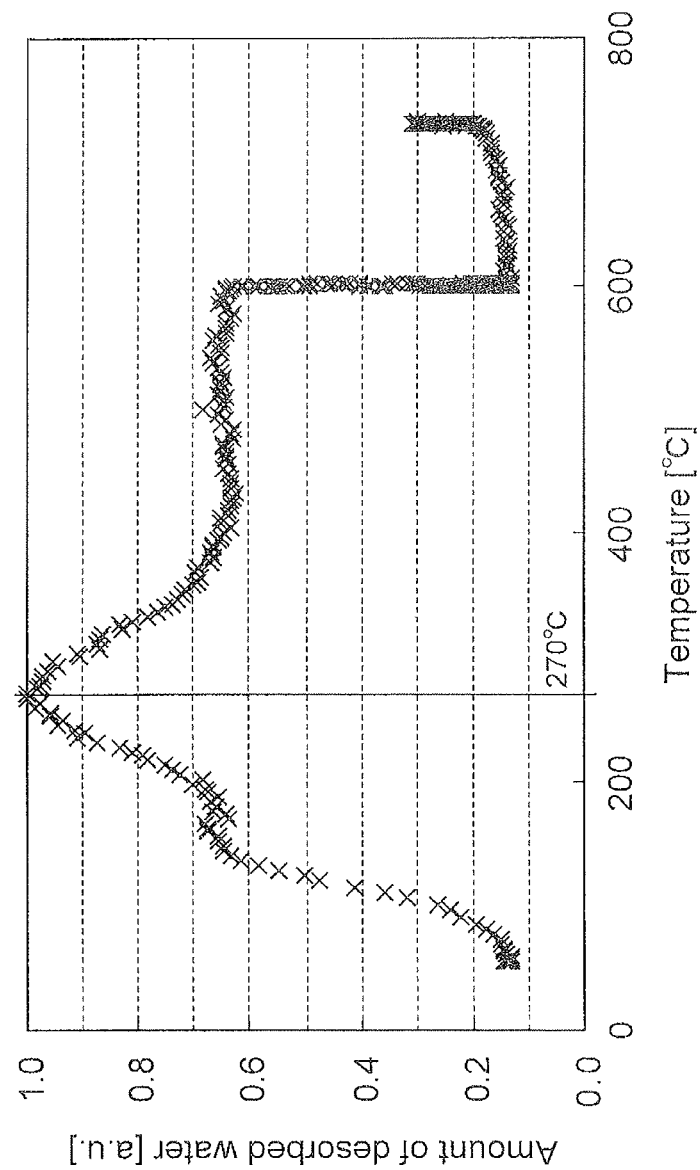
FIG. 2 is a graph illustrating a relationship between a temperature and an amount of desorbed water for potassium bromide (KBr) as an alkali metal salt raw material.

FIG. 2 is a graph showing a relationship between a temperature and an amount of desorbed water for potassium bromide (KBr) as an alkali metal salt raw material. It is seen that a desorption speed does not increase at a temperature of 270° C. or more, as illustrated in FIG. 2. Thus, it is preferable to perform processing at a temperature of 270° C. or more to dry the alkali metal salt raw material.

However, when the temperature increases from 600° C. to a melting point of KBr of 734° C., the desorbed water increases again. This is considered to be caused by desorption of hydration water in a KBr crystal due to melting of KBr. This desorption of the hydration water rarely decreases even when KBr is heated at a high temperature for a long time, unlike surface adsorbed water. Thus, it is difficult for the alkali metal salt raw material having a large particle size to be completely dried due to presence of internal hydration water.

In order to solve such a problem, the particle size of the alkali metal salt raw material may be decreased and a surface area per volume of the alkali metal salt raw material may be increased. When a solid of the alkali metal salt raw material has a spherical shape, a particle size D corresponds to a diameter of the sphere, and thus a surface area per volume becomes 6/D. Therefore, as the particle size D is smaller, the surface area per volume increases, and the amount of adsorbed water of the solid surface of the alkali metal salt raw material becomes greater than that of the hydration water contained inside the solid of the alkali metal salt raw material, thereby facilitating drying.

Figure 5:
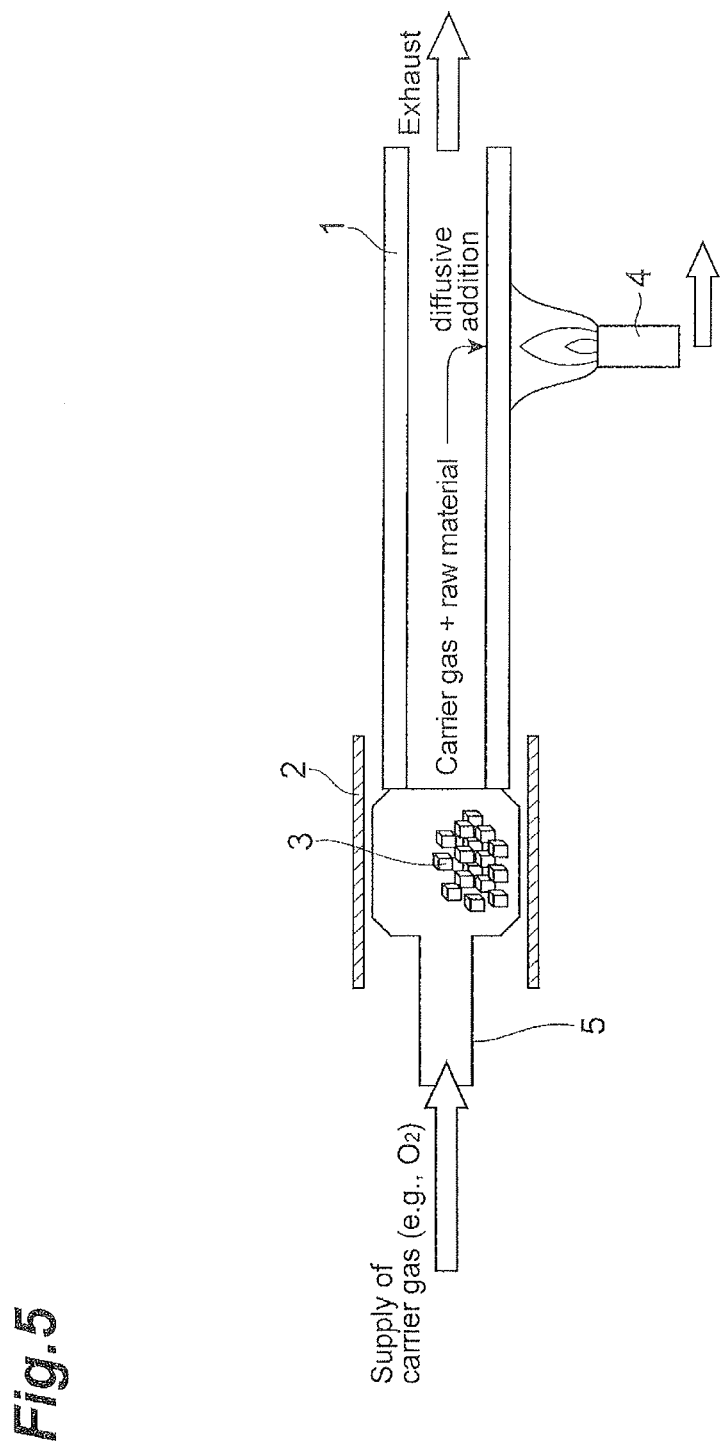
FIG. 5 is a diagram illustrating a thermal diffusion process in a method of manufacturing an optical fiber preform.

Next, a relationship between the particle size of the alkali metal raw material and absorption loss due to an OH group will be described using specific examples (examples) and comparative examples of the method of manufacturing an optical fiber preform according to the present embodiment. FIG. 5 is a diagram illustrating a thermal diffusion process in the method of manufacturing an optical fiber preform.

A used silica-based glass pipe 1 contained 100 atomic ppm of Cl and 6,000 atomic ppm of fluorine, concentration of other additives was a lower detection limit (about 1 ppm) or less, an outer diameter was 32 mm, and an inner diameter was 15 mm. A handling glass pipe 5 was connected to one end of this glass pipe 1, a portion of this handling glass pipe 5 was used as a raw material reservoir, and an alkali metal salt raw material 3 was set in the raw material reservoir. In this case, trial production of a first comparative example in which an average particle size of the alkali metal salt raw material KBr was about 3 mm was performed. Further, trial production of a second comparative example in which an average particle size of the alkali metal salt raw material KBr was about 1.5 mm was performed. Further, trial production of a first example in which the average particle size of the alkali metal salt raw material KBr was about 1.0 mm was performed. Further, trial production of a second example in which the average particle size of the alkali metal salt raw material KBr was about 0.5 mm was performed. Further, trial production of a third example in which the average particle size of the alkali metal salt raw material KBr was about 0.2 mm was performed. Further, a portion of the glass pipe 1 may be used as the raw material reservoir.

In the drying process, the alkali metal salt raw material 3 in the raw material reservoir was dried by maintaining, for 30 minutes, a state in which the outside of the raw material reservoir was heated to a temperature of 500° C. using an external heat source (electric furnace) 2 while introducing drying nitrogen (having a dew point of −76° C. or less) into the raw material reservoir as a carrier gas at 3 SLM (3 L/min when converted to the standard state).

After this drying process, a temperature of the raw material reservoir was adjusted to be 860° C., and heating was performed using an external heat source (oxyhydrogen burner) 4 so that a temperature of an outer surface of the glass pipe 1 become 2000° C. while introducing drying oxygen as a carrier gas into the raw material reservoir and the glass pipe 1 at 1 SLM. At this time, the oxyhydrogen burner was moved at a speed of 30 mm/min and the heating traverse was performed for 15 times to diffuse potassium into an inner surface of the glass pipe. The glass pipe 1 containing the alkali metal element diffused thereinto was heated using the oxyhydrogen burner 4 to be shrunk to have the inner diameter of about 4 mm.

After the shrinkage process, vapor phase etching of the inner surface of the glass pipe 1 was performed until the inner surface became about 5 mm in diameter by heating the glass pipe 1 to a temperature of 2000° C. using the oxyhydrogen burner 4 while supplying $SF_6$ and $Cl_2$ from a gas supply unit to the glass pipe 1.

After this etching process, the glass pipe 1 containing the alkali metal element was heated to a temperature of about 1400° C. using the oxyhydrogen burner 4 to be collapsing while performing exhaust so that the internal pressure of the pipe became about 100 kPa in absolute pressure, manufacturing an alkali metal doped glass rod having an outer diameter of about 25 mm.

After this collapsing process, the outside of the glass rod was ground sufficiently until an OH group was removed (specifically, until an outer diameter become about 70% or less compared to that after collapsing), to obtain a first core rod. A second core having a diameter about 3 times the diameter of the first core rod was provided on the outer side of the first core rod. The second core rod included silica-based glass containing 6,000 ppm on average of Cl and 1 ppm or less of other additives.

The first core and the second core were combined into a core portion, and silica-based glass added with fluorine, which was a first cladding portion, was synthesized onto an outer side of the core portion. A relative refractive index difference of the first cladding portion to the second core was about −0.33% for the first cladding portion having the minimum refractive index. Further, onto an outer side of the first cladding portion, silica-based glass added with fluorine, whose relative index difference to the second core was about −0.23%, was synthesized as a second cladding portion to obtain an optical fiber preform. The optical fibers according to the first and second comparative examples and the first to third examples were manufactured by drawing this optical fiber preform.

Figure 3:
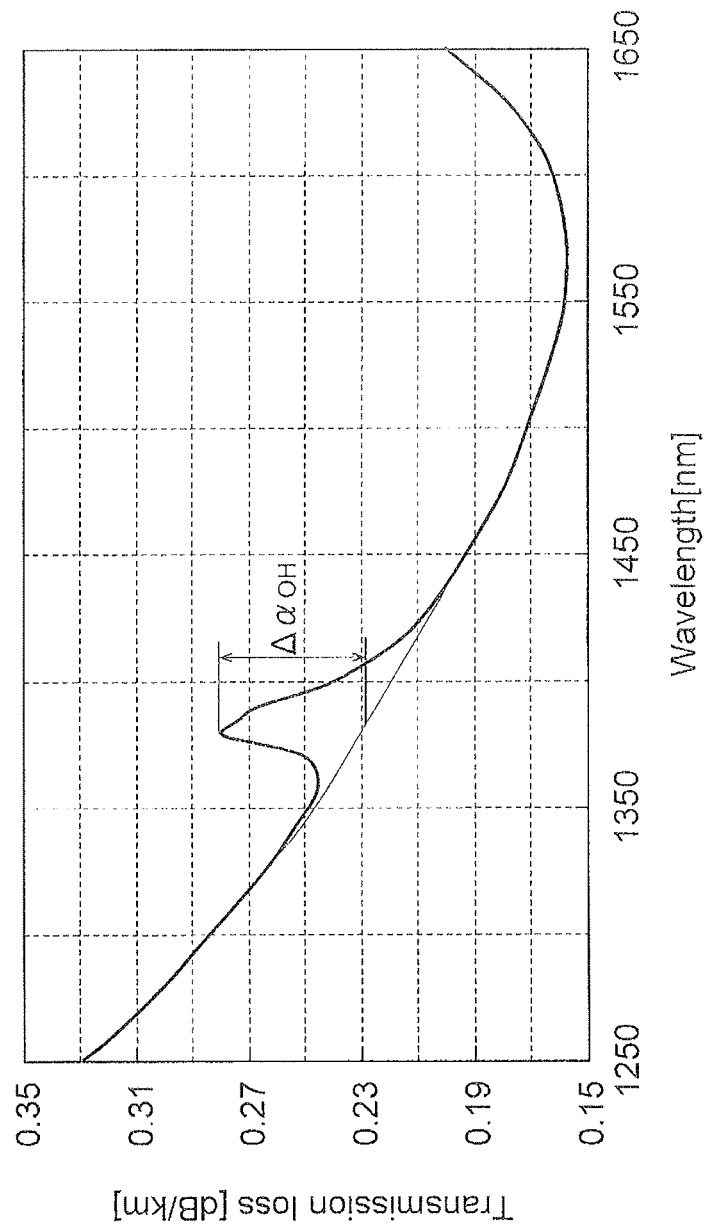
FIG. 3 is a graph illustrating wavelength dependency of a transmission loss of an optical fiber.
Figure 4:
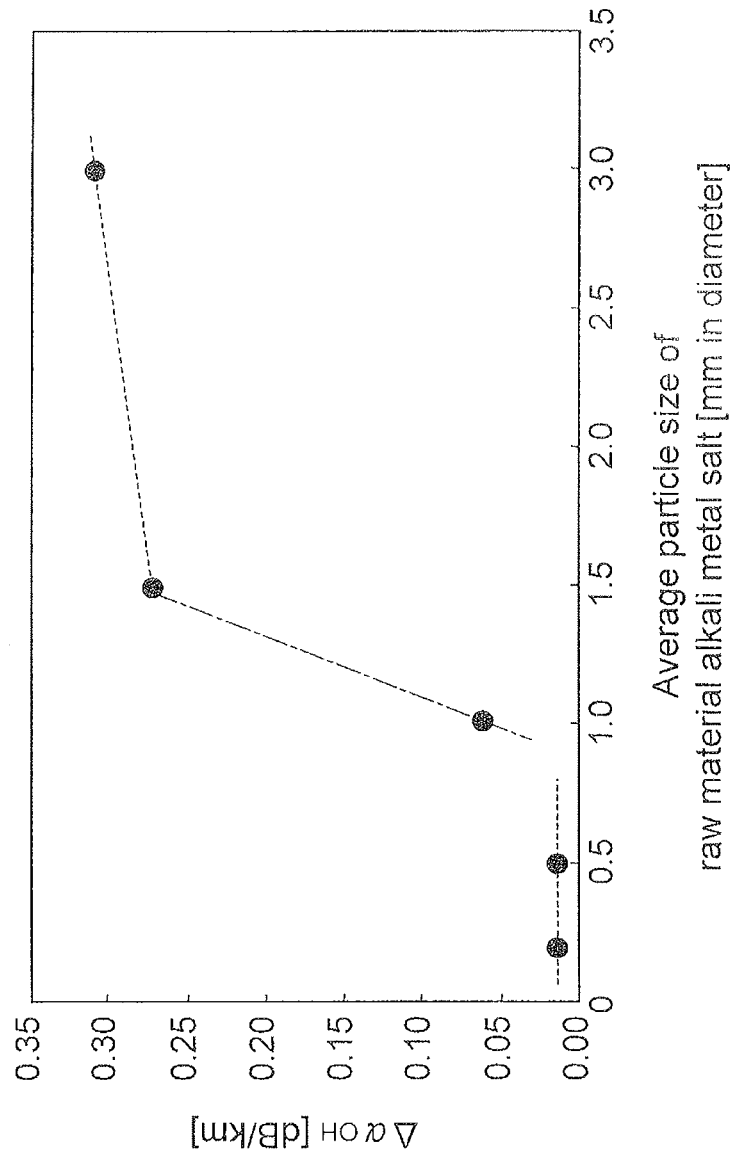
FIG. 4 is a graph illustrating a relationship between transmission loss increase $\Delta\alpha_{OH}$ due to OH group absorption at a wavelength of 1.38 μm and a particle size of the alkali metal salt raw material.

FIG. 4 is a graph showing a relationship between the transmission loss increase $\Delta\alpha_{OH}$ (see FIG. 3) due to OH group absorption at a wavelength of 1.38 μm in each optical fiber and the particle size of the alkali metal salt raw material. Specifically, in the optical fibers according to the first and second comparative examples in which the average particle sizes of the alkali metal salt were about 3 mm and about 1.5 mm, the transmission loss increases $\Delta\alpha_{OH}$ were 0.31 dB/km and 0.27 dB/km, respectively. Further, in the optical fibers according to the first to third examples in which the average particle sizes of the alkali metal salt were about 1.0 mm, about 0.5 mm, and about 0.2 mm, the transmission loss increases $\Delta\alpha OH$ were 0.062 dB/km, 0.013 dB/km, and 0.014 dB/km, respectively.

It is seen from FIG. 4 that the absorption loss $\Delta\alpha_{OH}$ due to the OH group is radically reduced to 0.1 dB/km or less when the average particle size of the alkali metal salt raw material is smaller than about 1 mm. Based on this, it is preferable for the average particle size of the alkali metal salt raw material to be about 1 mm or less.

When 1 mol·ppm of the OH group is present in the core portion of the silica glass based optical fiber, the optical fiber has an absorption loss $\Delta\alpha_{OH}$ of about 60 dB/km in a wavelength range of 1.3 μm. Therefore, when the absorption loss $\Delta\alpha_{OH}$ is 0.1 dB/km or less, the average concentration of the OH group in the core portion of the optical fiber preform is 0.002 mol·ppm or less. This OH group includes all OH groups in the coreportion of the optical fiber preform, that is, an OH group contaminated in a process of manufacturing an optical fiber preform, such as a performing thermal diffusion of the alkali metal element or collapsing the silica-based glass pipe doped with the alkali metal element, or an OH group included in the silica-based glass pipe itself used as a substrate, as well as an OH group contaminated from the alkali metal salt raw material.

Further, when the average particle size of the alkali metal salt raw material is about 0.5 mm or less, the absorption loss $\Delta\alpha_{OH}$ due to the OH group is greatly reduced to 0.05 dB/km or less, and the average concentration in the core portion of the optical fiber preform is greatly reduced to 0.001 mol·ppm or less. Therefore, it is more preferable for the average particle size of the alkali metal salt raw material to be 0.5 mm or less.

The optical fibers according to the first to third examples have the following common characteristics, in addition to the difference in the transmission loss increase $\Delta\alpha_{OH}$ due to the OH group absorption at a wavelength of 1.38 μm as illustrated in FIG. 4 due to a difference of the particle size of the raw material KBr. A potassium concentration (an average value in the core portion) was about 2 atomic ppm. The transmission loss (at a wavelength of 1300 nm) was 0.285 to 0.300 dB/km, and the transmission loss (at a wavelength of 1550 nm) was 0.155 to 0.165 dB/km. Chromatic dispersion (at a wavelength of 1550 nm) was +20.0 to +21.5 ps/nm/km, and a dispersion slope (at a wavelength of 1550 nm) was +0.055 to +0.065 ps/nm/km. An effective area (at a wavelength of 1550 nm) was 125 to 145 µm$^2$, and a mode field diameter (at a wavelength of 1550 nm) was 12 to 14 µm. A fiber cut-off wavelength (at a fiber length of 2 m) was 1400 to 1600 nm, and a cable cut-off wavelength (at a fiber length of 22 m) was 1300 to 1500 nm. Polarization mode dispersion (in the C and L bands) was 0.001 to 0.15 ps/√km, a non-linear refractive index (at a wavelength of 1550 nm, in a random polarization state) N2 was 2.1 to 2.2×10$^{-20}$ m$^2$/W, and a non-linear coefficient (at a wavelength of 1550 nm, in a random polarization state) was 0.6 to 0.7 (W·km)$^{-1}$. Thus, the optical fibers with a low transmission loss were obtained.

Thus, when the optical fiber is manufactured using the optical fiber preform including, as the core portion or a portion of the core portion, silica-based glass rod doped with the alkali metal by thermal diffusion of the alkali metal element into the silica-based glass pipe, the absorption loss increase $\Delta\alpha_{OH}$ due to the OH group in the optical fiber can be reduced to 0.1 dB/km or less and preferably 0.05 dB/km or less by using an alkali metal salt having an average particle size of 1 mm or less in diameter as the raw material of the alkali metal element. Further, in the drying process before the thermal diffusion process, it is preferable for the alkali metal salt raw material to be dried at a temperature equal to or more than 270° C. and less than the melting point of the alkali metal salt raw material (preferably, 550° C. or less).

Here, hydration water included in the alkali metal salt raw material is desorbed at its melting point, but it is considered difficult to completely remove this hydration water using drying at a temperature of the melting point or less, as can be seen from the result of the thermal desorption spectroscopy, as illustrated in FIG. 1. Therefore, it is considered more preferable to dry the alkali metal salt raw material having a particle size of 1 mm or less at a temperature equal to or more than 270° C. and less than the melting point of the alkali metal salt raw material (preferably, 550° C. or less) to desorb absorbed water on the surface, which makes up most of the water present in the alkali metal salt raw material, and then dry the alkali metal salt raw material at a temperature equal to or more than the melting point of the alkali metal salt raw material to slightly desorb the hydration water in the raw material.

Based on such knowledge, trial manufacture of a fourth example was performed. In this trial manufacture, an average particle size of the alkali metal salt raw material KBr was about 1 mm. Further, this trial manufacture was performed substantially similarly to the method described above, but a drying process was different from that in the method described above. In other words, in the drying process of this trial manufacture, first, a first drying process in which the alkali metal salt raw material 3 in the raw material reservoir was dried by maintaining, for 30 minutes, a state in which the outside of the raw material reservoir was heated to a temperature of 500° C. using an external heat source (electric furnace) 2 while introducing drying nitrogen (having a dew point of −76° C. or less) of a carrier gas into the raw material reservoir at 3 SLM (3 L/min when converted into the standard state) was performed. Then, in the drying process of the trial manufacture, a second drying process in which drying nitrogen of was introduced into the raw material reservoir as a carrier gas at 3 SLM in a state in which the alkali metal salt raw material 3 was melted by increasing a temperature of the external heat source (electric furnace) 2 to 750° C. was performed for 5 minutes.

In other words, the drying process in the trial manufacture of the fourth example includes the first drying process for heating the alkali metal salt raw material 3 at a temperature (e.g., 500° C.) less than the melting point of the alkali metal salt raw material 3 to dry the alkali metal salt raw material 3, and the second drying process for heating the alkali metal salt raw material 3 at a temperature (e.g., 750° C.) equal to or more than the melting point of the alkali metal salt raw material 3 to dry the alkali metal salt raw material 3 after the first drying process.

A transmission loss increase $\Delta\alpha_{OH}$ (see FIG. 3) due to the OH group absorption at a wavelength of 1.38 µm of the optical fiber according to the fourth example obtained in this way was very low at 0.011 dB/km. This is lower than 0.062 dB/km, which was the transmission loss increase $\Delta\alpha_{OH}$ of the optical fiber according to the first example in which the average particle size of the alkali metal salt raw material was about 1.0 mm. Further, the transmission loss increase $\Delta\alpha_{OH}$ of the optical fiber according to the fourth example at other wavelength was 0.286 dB/km at a wavelength of 1300 nm and 0.156 dB/km at a wavelength of 1550 nm. Thus, it is preferable to perform the second drying process at a temperature equal to or more than the melting point of the alkali metal salt raw material after performing the first drying process at a temperature equal to or more than 270° C. and less than the melting point of the alkali metal salt raw material (preferably 550° C. or less) in the drying process.

The core portion of the optical fiber preform contains the alkali metal element, Cl or fluorine, but it is preferable for a concentration of another additional material such as a transition metal: Ge, Al, P or Fe, Ni, or Cu to be as low as 1 ppm or less. Thus, the transmission loss of the optical fiber at a wavelength of 1550 nm can be as low as 0.18 dB/km or less. Further, in this case, it is preferable to make a refractive index of the cladding portion of the optical fiber preform lower than an average refractive index of the core portion by using the silica-based glass containing fluorine.

Further, the core portion of the optical fiber preform may contain the alkali metal element at a concentration of 500 atomic ppm or more as a peak value. The transmission loss at a wavelength of 1550 nm of the optical fiber manufactured using this optical fiber preform can be reduced to 0.17 dB/km.

A structure and a characteristic of the optical fiber are, for example, as follows. A transmission loss at a wavelength of 1550 nm of the optical fiber is preferably as low as 0.180 dB/km or less and more preferably 0.170 dB/km or less, or may be 0.160 dB/km or less. An effective area of the optical fiber may be about 70 to 160 µm$^2$ at a wavelength of 1550 nm. Chromatic dispersion at a wavelength of 1550 nm may be +15 to +22 ps/nm/km. A zero dispersion wavelength may be 1250 nm or more and 1350 nm or less. A dispersion slope may be +0.05 to +0.07 ps/nm$^2$/km at a wavelength of 1550 nm The transmission loss at a wavelength of 1380 nm is preferably 0.8 dB/km or less, more preferably 0.4 dB/km or less, or most preferably 0.3 dB/km or less.

The polarization mode dispersion in a wavelength range of 1550 nm may be 0.2 ps/√km or less. A cable cut-off wavelength may be 1530 nm or less, may be more preferably 1450 nm or less that is a pump wavelength used for a Raman amplification, or may be 1260 nm or less as in a standard single mode fiber. A diameter of the core portion is about 5 to 15 µm, and a relative refractive index difference of the core portion and the cladding portion ((refractive index of core portion—refractive index of cladding portion)/refractive index of core portion) is about 0.1 to 0.7%. A diameter of an outer circumference of the glass portion of the optical fiber may be about 110 to 150 μm, and a diameter of an outer circumference of the optical fiber coated with a resin may be about 200 to 300 μm.

Such an optical fiber is preferably used, particularly, as a light transmission path of an optical transmission system for long-distance optical communication.

INDUSTRIAL APPLICABILITY

According to the present invention, it is possible to manufacture an optical fiber preform suitable for drawing the optical fiber containing the alkali metal element and having low transmission loss in a wavelength range of 1.38 μm.

REFERENCE SIGNS LIST

1 . . . Glass pipe, 2 . . . Heat source, 3 . . . Alkali metal raw material, 4 . . . External heat source, 5 . . . Handling glass pipe

The invention claimed is:

1. A method of manufacturing an optical fiber preform, the method comprising:
   a thermal diffusion process including supplying a vapor of the alkali metal salt produced by heating the alkali metal salt raw material having an average particle size of 1 mm or less in diameter together with a carrier gas to the inside of a silica-based glass pipe from one end side of the glass pipe, and heating the glass pipe using a heat source which relatively moves in a longitudinal direction of the glass pipe to cause an oxidation reaction of the vapor of the alkali metal salt and thermally diffuse the alkali metal into an inner side of the glass pipe;
   a collapsing process of collapsing the glass pipe after the thermal diffusion process to prepare a core rod; and
   a cladding portion addition process of adding a cladding portion around the core rod prepared in the collapsing process.

2. The method of manufacturing an optical fiber preform according to claim 1, comprising a drying process of heating the alkali metal salt raw material at a temperature of 270° C. or more to dry the alkali metal salt raw material before the thermal diffusion process.

3. The method of manufacturing an optical fiber preform according to claim 2, wherein the alkali metal salt raw material is heated at a temperature less than a melting point of the alkali metal salt raw material to dry the alkali metal salt raw material in the drying process.

4. The method of manufacturing an optical fiber preform according to claim 2, wherein the drying process includes:
   a first drying process of heating the alkali metal salt raw material at a temperature less than a melting point of the alkali metal salt raw material to dry the alkali metal salt raw material; and
   a second drying process of heating the alkali metal salt raw material at a temperature equal to or more than the melting point of the alkali metal salt raw material to dry the alkali metal salt raw material after the first drying process.

5. The method of manufacturing an optical fiber preform according to claim 1, wherein the glass pipe contains chlorine and fluorine, an average concentration of each of the chlorine and the fluorine is 10 atomic ppm or more, and a concentration of other additives is 10 atomic ppm or less.

6. The method of manufacturing an optical fiber preform according to claim 1, wherein the alkali metal is thermally diffused into an inner side of the glass pipe so that the concentration of the alkali metal has a maximum value of 500 atomic ppm or more in the thermal diffusion process.

7. An optical fiber preform made by the method of manufacturing an optical fiber preform according to claim 1, wherein an average concentration of an OH group in a core portion is 0.002 mol·ppm or less.

8. An optical fiber made by drawing the optical fiber preform according to claim 7, wherein a transmission loss increase due to OH group absorption in a wavelength range of 1.38 μm is 0.1 dB/km or less.

* * * * *